Oct. 15, 1940.   N. LANGER   2,217,843
MEASUREMENT OF ELECTRICALLY CONDUCTIVE MATERIAL,
PARTICULARLY UPON A NONCONDUCTIVE BASE
Filed Dec. 28, 1937
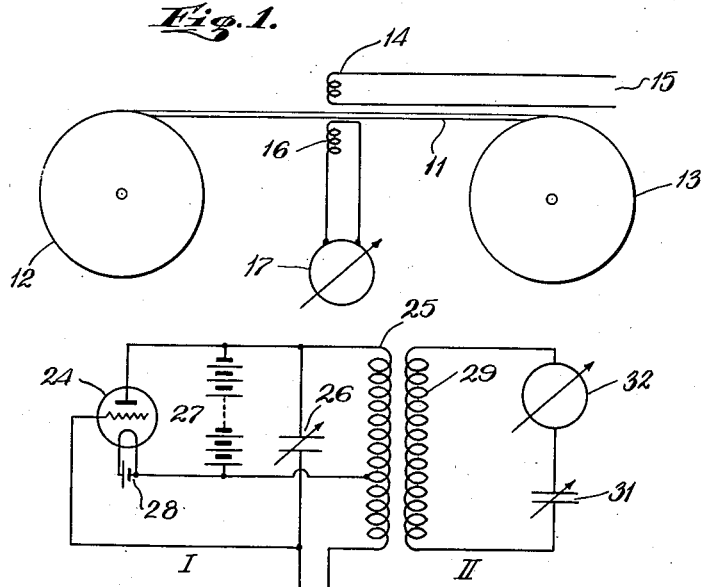
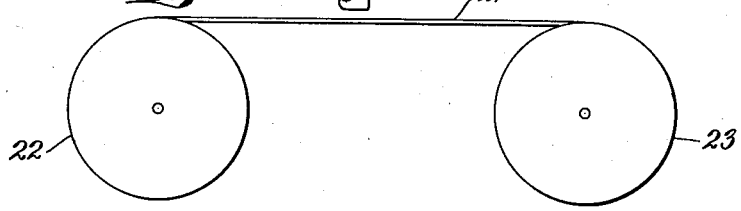
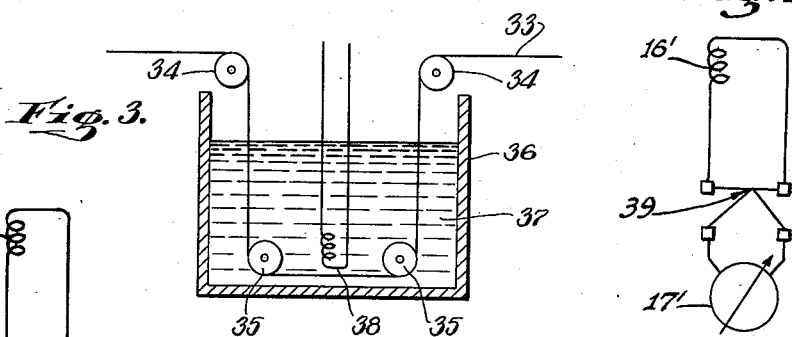
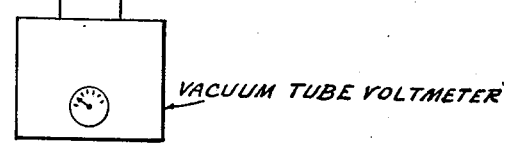
INVENTOR
NICHOLAS LANGER
BY
ATTORNEY Patented Oct. 15, 1940

2,217,843

UNITED STATES PATENT OFFICE 2,217,843

MEASUREMENT OF ELECTRICALLY CONDUCTIVE MATERIAL, PARTICULARLY UPON A NONCONDUCTIVE BASE

Nicholas Langer, New York, N. Y., assignor to Technical Measurement Corporation, Ridgewood, N. J., a corporation of New Jersey Application December 28, 1937, Serial No. 182,076
In Great Britain December 29, 1936

13 Claims. (Cl. 175—183)

This invention relates broadly to the measurement of electrically conductive material particularly upon a nonconductive base. It relates more especially to the art of photographic printing, reversing or enlarging, and, more particularly, to an improved method of and apparatus for integrating the translucency of a photographic film in order to determine the preferred intensity of illumination on the printing surface. The film the translucency of which is being measured may be moving or still.

For many years, efforts have been made automatically to determine the intensity of the light employed for printing or reversing a photographic negative in accordance with the density thereof. As those skilled in the art know, conventional integrating methods and apparatus invariably have involved the use of radiation-sensitive devices, such as photo-electric cells, selenium cells, thermopiles and the like. When it has been desired to determine the preferred intensity of illumination, a beam of light having constant intensity has been passed through the film subjected to the measurement, and subsequently impressed upon the light sensitive cell. The varying intensity of the light beam impinging upon the cell has varied the electrical condition of the cell, for example its resistance, and the variation in the cell and in the circuits associated therewith has been employed as an indication as to the translucency of the film.

Various disadvantages and inconveniences have been connected with these conventional integrating devices. Thus, photo-electric cells have been known to be relatively unstable, and subject to ageing and variations in their light sensitivity. In order to derive useful results, a large number of factors, such as the intensity of the light beam, the wave length of the light emitted, the sensitivity of the cells, and the like have had to be controlled and maintained constant with extreme care. Optical problems have had to be overcome in directing a suitable beam of light through the film and in impressing it upon the cell.

Moreover, the usefulness of many of the methods and apparatus previously proposed has been limited to conventional printing processes where there was no objection against exposing the film to be integrated to actinic light. In various cases, however, such as for example in the integrating operations connected with reversing films, it has been necessary to employ radiations which do not affect the light sensitive layer of the film, such for example, as infra-red radiations, and to employ thermopiles or the like to register the amount of radiation passed through the film. This procedure in turn has provided and caused new problems and difficulties in producing the suitable radiations, concentrating them, and in the relatively low sensitivity of thermopiles. Thermopiles are highly subject to the effect of various disturbing factors, such as changes in the surrounding temperature which either has to be maintained constant or has to be compensated for.

Clearly, a grave problem has existed for a considerable length of time in the art of photographic printing, reversing and enlarging in connection with the integrating of films to be printed or copied. Although from time to time various suggestions and proposals have been made to solve the outstanding problems and to provide a completely satisfactory integrating device, none of these various suggestions and proposals, so far as I am aware, has been completely satisfactory and successful when carried into practice on a practical and industrial scale.

Under certain circumstances, notably in connection with the reversal of negative motion picture films into positives, it is desirable automatically to measure the density while the film is wet or completely immersed in a liquid. So far as I am aware, no radiation responsive device can be employed under such conditions.

I have discovered a simple satisfactory solution of these problems.

It is an object of the present invention to provide a novel method of integrating films which is free from the disadvantages and inconveniences of conventional methods.

It is another object of the invention to provide a novel and improved method of integrating films to be printed, reversed or enlarged which completely dispenses with the application of optical radiations of visible or invisible wavelength and instead employs an electro-magnetic field affected by the metallic deposit of the film.

It is a further object of the invention to provide a fundamentally novel method of determining the transparency of a film, which operates equally satisfactorily with a film which has been developed and fixed and with a film which is still sensitive to the effect of radiation. This novel method reduces the determination of transparency to measuring the amount of metallic deposit or its distribution on the surface of the film.

Moreover, the invention also contemplates an apparatus for carrying the process of the invention into practice in a simple, practical and foolproof manner.

It is also within contemplation of the invention to provide a simple and efficient integrating device, which is simple in construction, efficient and inexpensive in operation, and may be manufactured and operated at a low cost.

Other and further objects and advantages of the invention will become apparent from the following description taken in conjunction with the accompanying drawing, in which:—

Figure 1 is a diagrammatic view illustrating a preferred embodiment of the invention.

Figure 2 illustrates a modified embodiment of the invention in an integrating device, and Figure 3 depicts the novel integrating device associated with a treating tank.

Figure 4 is a fragmentary view of a portion of the structure of Figure 1 illustrating my invention as practiced with a thermocouple.

Figure 5 is a fragmentary view of a portion of the structure of Figure 1 illustrating my invention as practiced with a vacuum tube voltmeter.

Broadly stated, according to the principles of the invention an electro-magnetic field of alternating character is provided and the film to be integrated is passed in proximity to or through said field. As those skilled in the art know, all photographic films both in finished and unfinished condition embody finely distributed metallic particles in the form of emulsions. These metallic particles, constituted in most cases of silver in finely distributed form, will absorb a portion of the electro-magnetic energy present in the electro-magnetic field which is employed. Thus, the field will be varied or distorted by the presence of the metallic particles and the variations caused in the intensity or distribution of the field may be employed as an indication of the amount of silver particles on the surface of the film under measurement. Since the amount of silver present or remaining on the surface of the film determines the transparency thereof, the measurement of light permeability or translucency is reduced or converted into a measurement of electro-magnetic character.

I have found that in view of the minute character of the metallic deposits an electro-magnetic field of high frequency should be employed in order to obtain sufficient and readily measurable variations. Preferably, alternating currents or oscillations having a frequency of several millions are employed having the character of the short or ultra-short waves employed in the art of radio. Of course, a great variety of arrangements may be employed both for the production of these oscillations and for the provision of an electro-magnetic field thereby. Likewise, a great number of circuits and arrangements may be employed for measuring the variations or distortions of the electro-magnetic field established and for utilizing such measurements for the automatic adjustment of light sources and apertures, as is customary in the art of automatic printing. Therefore, the following description of certain preferred embodiments of the invention are merely illustrative of the various forms the invention may take.

In the embodiment of the invention illustrated in Figure 1, a film 11 is passed from a carrier 12 to a second carrier 13. At an intermediate portion of the film an energy transmitting coil 14 is provided having its axis substantially vertical to the surface of the film and connected as by a circuit 15 to a source of high frequency electrical energy. On the other side of the film is arranged an energy receiving or exploring coil 16 which is connected to a measuring instrument, responsive to high frequency electrical energy, such as for example a high frequency micro-ammeter, tube voltmeter, thermocouple, or the like.

In Figure 1 the measuring instrument 17 is a high frequency micro-ammeter. Figure 4 is a fragmentary view of a portion of the subject matter of Figure 1. In Figure 4 16' represents an exploring coil corresponding to coil 16 of Figure 1 and 39 a conventional thermocouple which is read as by a millivoltmeter 17' calibrated directly in amperes or in any other desired conventional manner. Similarly in Figure 5 the exploring coil 16'' corresponds to the exploring coil 16 of Figure 1 while the measuring instrument is represented as a vacuum tube voltmeter.

From the preceding description the operation of this preferred embodiment will be readily understood. The energy transmitting coil 14, connected to a source of high frequency energy, will establish a high frequency electro-magnetic field through the film and will set up a current of similar frequency in the exploring coil 16. The varying amount and distribution of metallic particles on the surface of the explored film will cause absorption of electrical energy so that part of the energy will be dissipated in the body of such particles and will not reach the exploring coil 16. The decrease in the electric current set up in the explorer circuit and coil as indicated by the instrument 17 is a function of the amount of metallic particles present on the surface of the film and therefore an indication of the transparency of the film at the explored portion thereof. The variation in the intensity of the current in the exploring circuit may be suitably amplified, if necessary, and may be employed in conventional manner to actuate and to adjust various elements affecting the progress of printing, reversing or enlarging, as this is customary in the art. Such variations, for example, may change the effectiveness of a printing light, or of a flashing light in the process of reversal, by the introduction of screens into the path of the light or of resistance devices into the light circuit.

The embodiment of the invention illustrated in Figure 2 is particularly advantageous when very great sensitivity is desired. A film 21 is passed between carriers 22 and 23 and in the proximity of an exploring coil 30. The exploring coil 30 is connected in a conventional oscillation producing circuit I constituted of a thermionic valve 24, a tapped inductance 25, and a variable condenser 26. Filament current and plate current are supplied to the thermionic valve by a filament battery 28 and a plate battery 27, respectively. The exploring coil 30 is connected in series with the inductance 25 and forms part of the total inductance in the circuit. As those skilled in the art know, a circuit of the described character produces electrical oscillations the frequency of which is determined by various factors including the total capacity and inductance in the circuit. The inductance 25 is loosely coupled with another inductance or secondary inductance 29 which is connected in a circuit II of tuned character with a variable condenser 31 and a measuring instrument 32. It is desirable to keep the total resistance and thus the damping in the circuit 29, 31, 32 at a low value in order to permit sharp tuning and sharp frequency response.

It will be readily understood by those skilled in the art the measuring instrument 32 may be either the high frequency micro-ammeter of Figure 1, a thermocouple as of Figure 4, a tube voltmeter as of Figure 5 or the like.

When beginning the measuring operation, the circuits I and II are so adjusted, for example by means of the variable condensers 26 and 31, that the frequency of the high frequency current produced in circuit I will be identical with the frequency to which circuit II is tuned. In view of the fact that the exploring coil 30 is connected with the inductance 25, it will establish an electro-magnetic field through which the film to be explored passes. The metallic particles forming the surface layer of the film 21 will absorb part of the energy present in said electro-magnetic field and will vary the apparent inductivity of the coil 30. This in turn will change the frequency of the oscillations produced in circuit I. In view of the fact that circuit II, which is coupled to circuit I, is sharply tuned to the original frequency of circuit I, a very slight change in frequency will cause a very substantial decrease in the amount of current transferred to circuit II which decrease is readily indicated by the instrument 32. If desired, one or several intermediate tuned circuits may be interposed between circuits I and II all of which are tuned to the same frequency and are coupled to each other, further to increase the sensitivity of the arrangement, as the selectivity of a conventional radio receiver may be increased by employing a plurality of tuned circuits. As in the arrangement of Figure 1, the variations in current intensity in circuit II and indicated by the instrument 32 may be employed in any conventional or preferred manner to change the effectiveness of a printing or reversal light or otherwise control a printing or reversing operation.

Figure 3 illustrates a modification of the arrangement of Figures 1 or 2. In this modification, the exploring coil 38 is submerged in a treating tank 36, containing a treating liquid 37. A film 33, to be treated, is guided through the tank by means of rollers 34 and 35 in such manner that the film passes in the immediate proximity of the exploring coil. Although the treating liquid will provide additional absorption of electrical energy, this additional absorption is of a constant character and may be readily compensated for in the determination of the desirable illumination from the amount of metallic deposit on the film. The coil 38, it will be seen, may be substituted for the coils 16 and 30 of Figures 1 and 2 respectively. In view of the similarity of construction, the operation of this modified embodiment will be readily understood by those skilled in the art without any further explanation.

Although the present invention has been described in connection with a few preferred embodiments thereof, variations and modifications may be resorted to by those skilled in the art without departing from the principles of the present invention. All of these variations and modifications are considered as within the true spirit and scope of the present invention as disclosed by the present specification and defined by the appended claims.

In the subjoined claims, the term "film" is used broadly to include any carrier, whether flexible or otherwise, of photographic material. If it is desired to measure the transparency of a single image, as distinct from successive images as upon a motion picture film, the measurement of said image is compared with the figure representing the transparency of an image of known density or the current-change caused by said image is employed to adjust a printing or reversing light.

I claim.

1. The method of exploring the translucency of a photographic film which comprises establishing an alternating electro-magnetic field, subjecting to said field a film to be explored thereby causing variations in the distribution of said field, and determining the translucency of the film by measuring said variations and hence determining the treatment to which the film shall be subjected.

2. The method of measuring the density of a photographic film, comprising establishing an alternating electro-magnetic field and an electric circuit associated therewith, subjecting a film to said field thereby causing variations in said associated circuit in accordance with the variations in the density of the film, and determining the density of the film by measuring said variations.

3. The method of measuring the density of a photographic film, comprising establishing an alternating electro-magnetic field, establishing an electric circuit associated with said field, treating the film with a liquid, subjecting the film while wet to said field thereby causing variations in said associated circuit in accordance with the variations in the density of the film, and determining the translucency of said film from said variations.

4. The method of measuring the density of a photographic film, comprising establishing an alternating electro-magnetic field, establishing an electric circuit associated with said field, subjecting the film to said field thereby causing variations in said associated circuit in accordance with the variations in the density of the film, measuring said variations by a tube voltmeter, and using said measurements to determine the treatment to which the film shall be subjected.

5. The method of measuring the density of a photographic film, comprising establishing an alternating electro-magnetic field, establishing an electric circuit associated with said field, subjecting the film to said field thereby causing variations in said associated circuit in accordance with the variations in the density of the film, measuring said variations by a thermocouple, and using said measurements to determine the treatment to which the film shall be subjected.

6. The method of measuring the density of a photographic film, comprising establishing an alternating electro-magnetic field of high frequency, establishing an electric circuit associated with said field, subjecting the film to said field thereby causing variations in said associated circuit, and determining the density of said film from said variations.

7. The method of measuring the density of a photographic film, comprising establishing an alternating electromagnetic field of radio frequency, establishing an electric circuit associated with said field, subjecting the film to said field thereby causing variations in said associated circuit, and determining the density of said film from said variations.

8. The method of measuring the density of a photographic film which comprises establishing an alternating electro-magnetic field by a generating circuit, initially tuning a second electric circuit to the same frequency as said generating circuit, loosely coupling said second circuit to said first or generating circuit, subjecting a photographic film to said field thereby causing relatively large variations in said second or coupled circuit, and measuring said variations to determine the density of the film.

9. The method of determining the effectiveness of a light to which a film is subjected as for the purpose of printing or reversal which comprises establishing an alternating electro-magnetic field, associating an electric circuit with said field, subjecting the film to said field thereby causing variations in said associated circuit, and using said variations to control the effectiveness of said light.

10. In an apparatus for measuring the density of a photographic film, means for creating an alternating electro-magnetic field, means for subjecting a photographic film to said field, and means responsive to the variations in the alternations of said field for determining the density of the film.

11. In an apparatus for measuring the density of a photographic film, means for creating an electro-magnetic field, means for processing the film including the application of moisture thereto, means for subjecting the film to said field while it is wet, and means responsive to the variations in the alternations of said field for determining the density of the film.

12. In an apparatus for measuring the density of a photographic film, means for creating an alternating electro-magnetic field, a secondary circuit associated with said field, means for subjecting a photographic film to said field thereby causing variations in said secondary circuit, and means responsive to said variations in said secondary circuit for determining the density of the film.

13. In an apparatus for measuring the density of a photographic film, a generating circuit which establishes an alternating electro-magnetic field, a second electrical circuit loosely coupled to said first circuit, means for initially tuning said second circuit to the same frequency as said generating circuit, means for subjecting a photographic film to said field thereby causing relatively large variations in said second or coupled circuit, and means for measuring said variations thereby determining the density of the film.

NICHOLAS LANGER.